United States Patent [19]

English et al.

[11] 4,298,908

[45] Nov. 3, 1981

[54] FLASHLAMP DISK CONTAINING INTERNAL REFLECTORS

[75] Inventors: George J. English, Reading; Robert E. Levin, South Hamilton; Timothy Fohl, Carlisle, all of Mass.

[73] Assignee: GTE Products Corporation, Stamford, Conn.

[21] Appl. No.: 46,874

[22] Filed: Jun. 8, 1979

[51] Int. Cl.³ .............................................. G03B 15/02
[52] U.S. Cl. ........................................ 362/14; 362/15
[58] Field of Search .................................... 362/14, 15

[56] References Cited

U.S. PATENT DOCUMENTS

| | | | |
|---|---|---|---|
| 3,267,272 | 8/1966 | Fischer | 362/15 |
| 3,860,809 | 1/1975 | Shoupp et al. | 362/14 |
| 4,098,565 | 7/1978 | Van de Weijer | 362/14 |

Primary Examiner—Brooks H. Hunt
Attorney, Agent, or Firm—Lawrence R. Fraley

[57] ABSTRACT

A disk-shaped flashlamp unit for use within an indexing means or mechanism associated with a camera. The unit includes several, e.g. ten, electrically-activated flashlamps radially disposed within the unit's plastic, light-transmitting housing. A pair of planar reflectors are utilized for each lamp to reflect the light therefrom through the housing. Light output can be further enhanced by utilization of two additional planar reflective members adjacent each lamp, the four members surrounding the side and bottom portions of the flashlamp's envelope to thereby direct light emitted from the flashlamp in a substantially singular direction through the peripheral region of the plastic housing. The invention's reflectors also assure prevention of sympathetic ignition.

12 Claims, 4 Drawing Figures

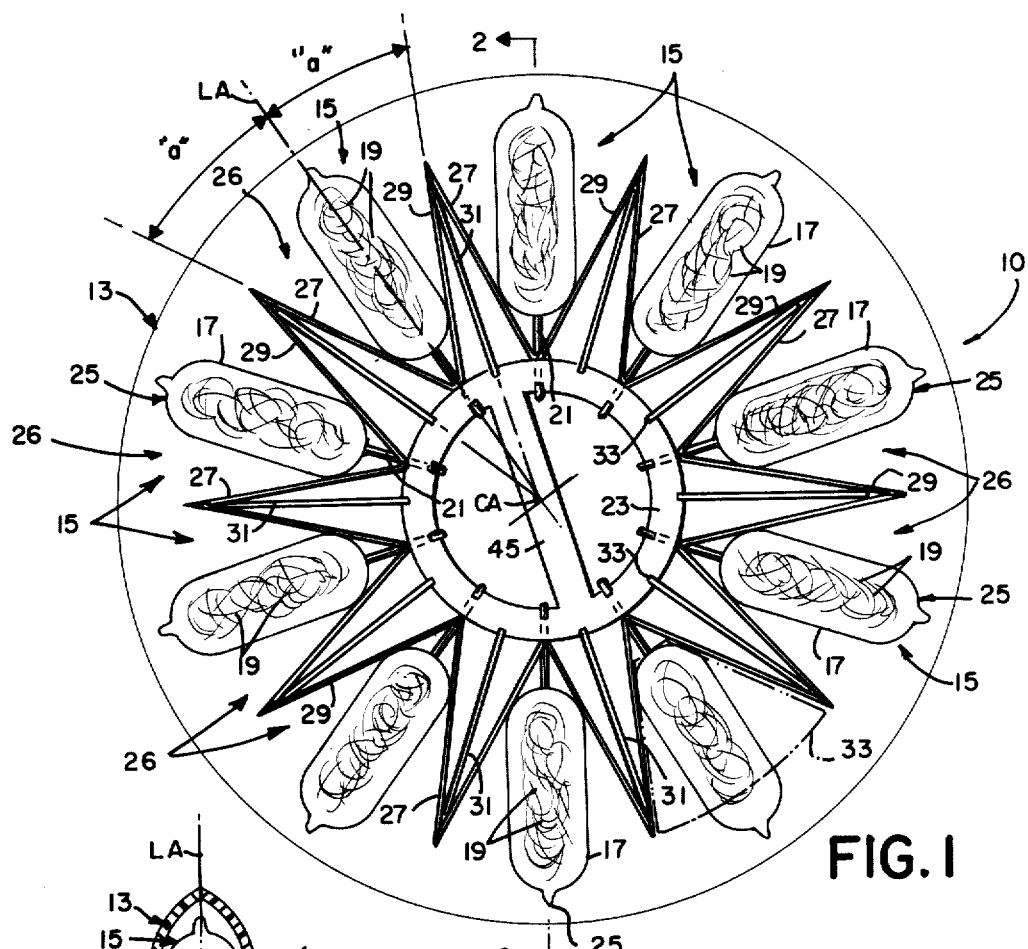
FIG.1
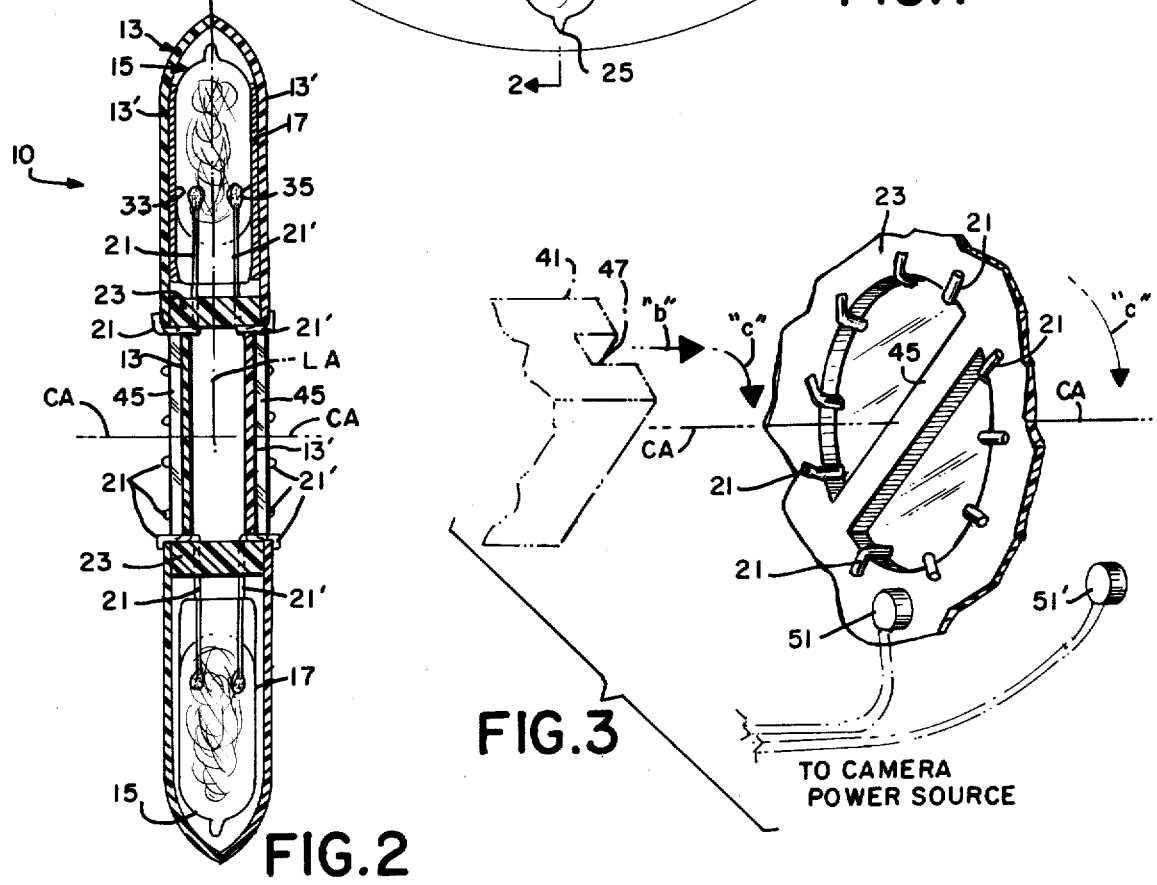
FIG.2
FIG.3
TO CAMERA POWER SOURCE though # 4,298,908

FLASHLAMP DISK CONTAINING INTERNAL REFLECTORS

BACKGROUND OF THE INVENTION

The invention relates to disposable flashlamp units for use with photographic cameras and particularly to such units which utilize a plurality of flashlamps. Even more particularly, the invention relates to units of the variety described wherein the flashlamps are electrically activated.

Examples of the above units currently available on the marketplace include the earlier popular "flashcube" models and the more recently introduced "flashbar" and "flip-flash" units. These units are shown and described in U.S. Pat. Nos. 3,327,105 (Kottler et al), 3,598,984 (Slomski), and 3,937,946 (Weber), respectively. The flashlamps utilized therein usually depend on activation from a power source within the camera, typically in the form of dry cell batteries or piezoelectric elements. As illustrated in the above patents, optimization of light output during lamp firing is only possible by orienting the lamp such that at least part of the longitudinal body thereof faces the subject being photographed. A single, curvilinear reflector, usually formed from a sheet of synthetic plastic material, is located behind and along side portions of each lamp to further enhance forward output therefrom.

Understandably, the aforedescribed required positioning relationships do not readily permit miniaturization of the product, particularly when said product includes several (e.g. eight or more) flashlamps. A typical "flip-flash", for example, possesses a length of about 4.75 inches, a width of about 2.0 inches, and a thickness (depth) greater than about 0.5 inches. Connecting tabs protruding from the product's ends add even further to the length dimension.

An attempt to achieve miniaturization while still providing the features desired in such flashlamp products (e.g. several lamps, relatively high output, etcetera) is shown in U.S. Pat. No. 4,098,565 (deWeijer). One problem inherent in this device, however, is the ready opportunity for sympathetic flashing between two adjacent lamps due to the required close spacing thereof. It is established in the photoflash lamp art that radiant energy emitted from a fired lamp will cause an adjacent lamp to also ignite when the spacing therebetween is less than approximately twice the lamp diameter. In no case should the distance be less than $2R(\sqrt{3}-1)$, where R is the radius of one lamp. Another disadvantage of the flashlamp unit of U.S. Pat. No. 4,098,565 is that said unit can only be utilized with a camera or attachment which includes a relatively complex, fixed reflector. Understandably, such a requirement necessitates extensive modification to current camera lines potentially desirous of utilizing such a product. Still further, any misalignment between the camera reflector and flashlamp unit will have an adverse affect on the ultimate light output.

It is believed therefore that a flashlamp unit which readily lends itself to miniaturization while still assuring relatively high output from each of several flashlamps contained therein will constitute a significant advancement in the art.

OBJECTS AND SUMMARY OF THE INVENTION

It is, therefore, a primary object of the present invention to enhance the flashlamp unit art by providing a flashlamp unit possessing the advantageous features described above.

In accordance with one aspect of the invention, an improved flashlamp unit is provided which comprises a disk-shaped housing having several flashlamps disposed in a radial pattern therein. A plurality of individual reflectors are also located within the housing, each reflector positioned adjacent a respective one of the flashlamps to reflect the light emitted from the lamp through the disk-shaped housing. Each reflector also serves to prevent sympathetic ignition between each respective lamp and lamps located within the housing adjacent thereto.

BRIEF DESCRIPTION OF THE DRAWINGS

FIG. 1 is a side, elevational view of a flashlamp unit in accordance with one embodiment of the invention;

FIG. 2 is a front, elevational view, in section, of the flashlamp unit of FIG. 1 as taken along the line 2—2 therein;

FIG. 3 is a partial perspective view of the invention shown in cooperative relationship with an indexing means (phantom) associated with a camera.

DETAILED DESCRIPTION OF THE PREFERRED EMBODIMENTS

Figure 4:
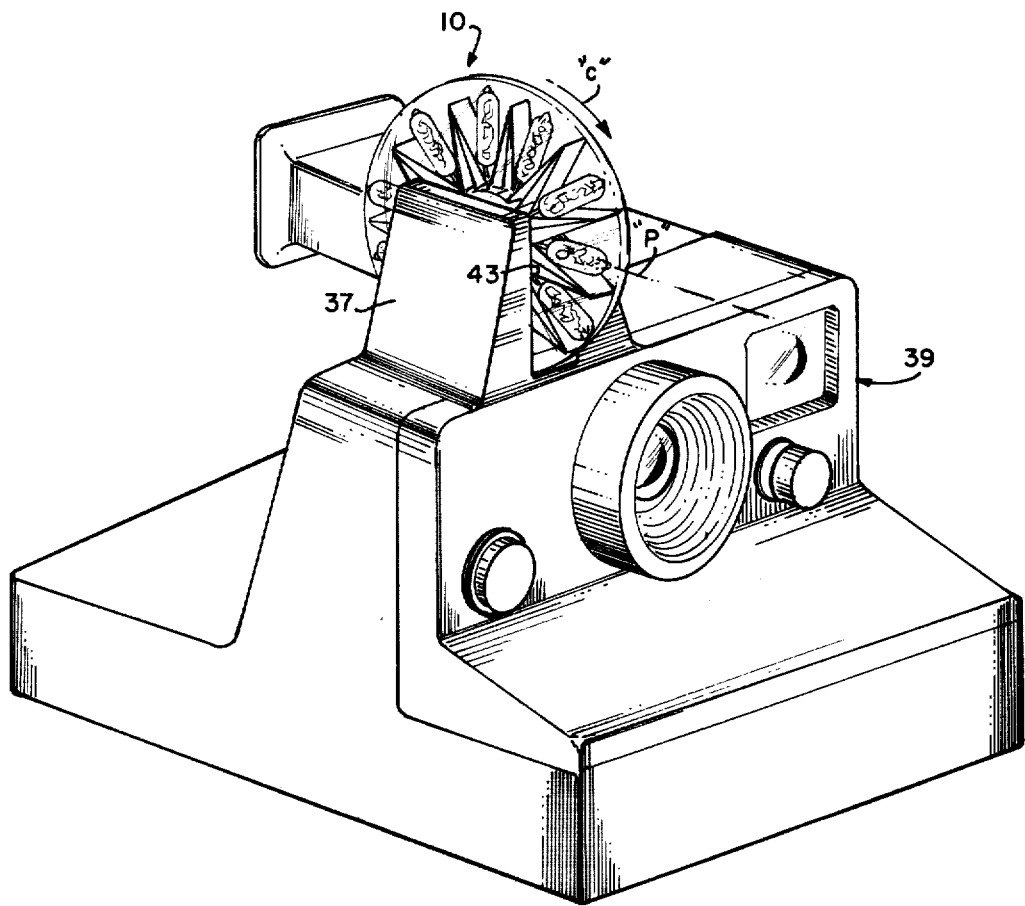
FIG. 4 is a perspective view of a camera having the present invention located thereon.

For a better understanding of the present invention together with other and further objects, advantages and capabilities thereof, reference is made to the following disclosure and appended claims in connection with the above described drawings.

With particular reference to FIG. 1, there is shown a flashlamp unit 10 in accordance with a preferred embodiment of the invention. Unit 10 includes a disk-shaped (round), two-part housing 13 of light-transmitting plastic material (e.g. acrylic, polystyrene). Housing 13 has an outer diameter of only 2.15 inches and a thickness of only 0.35 inch, thus indicating the compactness of the present invention in comparison to many photoflash products available today. Located in a radial pattern about the central axis (CA-CA) of housing 13 are a plurality of chemical flashlamps 15, each having a longitudinal axis (LA-LA). As shown, lamps 15 are arranged such that each longitudinal axis passes through (intersects) central axis CA-CA. As also shown in FIG. 2, the longitudinal axes of lamps 15 occupy a common plane perpendicular to axis CA-CA. By the term "chemical" flashlamp is meant a flashlamp having a light-transmitting (e.g. glass) envelope 17 with a quantity of combustible material 19 (e.g. shredded zirconium or hafnium) and a combustion-supporting atmosphere (e.g. oxygen) therein. Ignition of the lamp can occur electrically or mechanically. Those of the mechanically-activated variety are also referred to in the art as "percussive" flashlamps and typically include a metal primer tube projecting from the glass envelope and sealed therein. Striking this primer tube with sufficient force to cause deformation thereof causes a quantity of fulminating material therein to deflagrate through the tube and instantaneously ignite the combustible material 19. The result is a highly intense burst of light sufficient to properly illuminate a subject in a darkened environment. A typical output for such a lamp, when utilized in conjunction with a suitable reflector, is from about 5,000 to about 12,000 lumen seconds with the peak intensity occurring between 5 and 15 milliseconds after ignition.

The above outputs are also typical for chemical flashlamps which depend on electrical energy for ignition. Lamps of this variety usually include a pair of conductive lead wires sealed within the envelope and protruding therefrom. These wires are adapted for making contact with circuitry which in turn is connected to the desired power source. Usually this source is located within the camera and may consist of dry cell batteries or piezoelectric elements. It will be understood from the following description that the preferred flashlamps for use with the present invention are those which require relatively high voltage firing pulses for ignition such as provided by the aforementioned piezoelectric elements. That is, flashlamps 15 are preferably of the electrically-activated variety and are activated by a voltage pulse within the range, for example, of about 500 to 4000 volts. It must be understood, however, that the lamps of unit 10 may also be of the electrically-activated type capable of being ignited by much lesser voltages (e.g. by dry cell batteries as presently used in many of today's cameras). It is also possible to utilize the aforedefined percussively-activated flashlamps, in the event the present invention is to be used with cameras not including the described power sources.

Flashlamps 15 differ from those typically used in the art in that the envelope length is reduced to only about 0.750 inch. The quantity of combustible material 19 has also been reduced over quantities normally used to within the range of 10 to 30 milligrams. Most high voltage flashlamps contain approximately 40 milligrams of shredded material. To further emphasize the miniaturization aspect of the present invention, the outer diameter of each flashlamp 15 is only about 0.265 inch.

The preferred number of lamps in unit 10, as shown in FIG. 1, is ten, each disposed about the described radial pattern at equal (36 degree) intervals. The conductive lead wires 21, 21' which project from the lamp's envelope are each secured within an annular member 23 which in turn is secured within housing 13. As shown in FIG. 2, the leads 21, 21' of each lamp pass through a respective one of the parts 13' to project from housing 13 on opposing sides thereof. Member 23 is plastic (e.g. polyvinyl chloride, acrylic) and also functions to add rigidity to the central portion of the housing. Member 23 has an outer diameter of about 1.0 inch, an internal diameter of about 0.750 inch, and a thickness of 0.300 inch. As shown in FIG. 2, annular member 23 is coaxially positioned (about axis CA-CA) in housing 13.

As mentioned above, housing 13 is comprised of two parts (13'), each represented in FIG. 2 by the numerals 13'. Each part is light-transmitting in all portions thereof. It is understood, however, that only the outermost portions (peripheral region) of the housing need possess this characteristic in order to assure adequate operation of unit 10. By the term "peripheral region" is meant that portion of housing 13 immediately adjacent the top portion 25 of the invention's lamp envelopes. The top (or tip) portion is recognized as that part of the envelope opposite the end containing lead wires 21, 21'. In the event that it is desired to utilize unit 10 with an auxillary reflector which forms part of the camera or a separate indexing unit therefor, the positions of housing 13 immediately adjacent the sides of the lamp's envelopes should also be light-transmitting. One of the significant and unique features of the present invention, however, is that this requirement is not necessary as the result of the provision of an internal reflector 26 adjacent each lamp. Each reflector 26 directs light emitted by the respective lamp out through the defined peripheral region of housing 13. In addition, reflectors 26 prevent the possibility of sympathetic ignition of adjacent lamps 15 when only one is fired. All of these features, in addition to the high intensity outputs defined below, are provided by unit 10 while still assuring miniaturization thereof and the advantageous characteristics inherent therewith.

Each reflector 26 includes first and second substantially planar reflective members 27, 29 spacedly and opposingly positioned along the longitudinal sides of each lamp 15. Members 27, 29 of each reflector 26 converge toward annular member 23 and are secured thereto (e.g. by a suitable epoxy). It is permissable for the inner end portions (those toward the center of housing 13) of members 27 and 29 to engage each other at the outer periphery of annular member 23. As an alternative embodiment, slots could be provided in the outer surface of member 23 to accommodate the described inner end portions. The outer end portions of planar reflective members 27 and 29 respective to each lamp 15 diverge with respect to each other toward the aforedescribed peripheral (or outer) region of housing 13, each thus forming an angle "a" with the longitudinal axis of lamp 15. Angle "a" is within the range of about 25 to about 33 degrees. In one embodiment of the invention, each planar reflector was oriented at an angle of 30 degrees to provide the light output described below. As shown in FIG. 1, the first planar reflective members 27 from each lamp abut (in a substantially back-to-back relationship) the second reflective members 29 of the respective adjacent lamps. Each pair of abutting members is thus oriented between an adjacent pair of lamps to assure prevention of the described sympathetic ignition.

In addition to providing the described reflecting and prevention of sympathetic ignition features, each of the planar reflective members 27 and 29 of each reflector 26 engage an outer surface of the respective lamp 15 in the manner shown in FIG. 1 to support the lamp and thus maintain upright alignment thereof within housing 13 and with respect to the reflective member themselves. Such alignment is, of course, deemed critical to assure proper light output during ignition of the lamp. It is also understood from the positioning relationship depicted in FIG. 1 that the two planar members of each reflector act in a cooperative manner (by engaging opposing sides of the lamp) to provide the aforedefined supportive and alignment functions.

As further shown in FIG. 1, a plurality of spoke members 31 are located in spaced relationship within housing 13. Each spoke 31 is secured at one end within a corresponding groove 33 of annular member 23 and is located between a pair of adjacent lamps 15. It is also possible to mold spokes 31 as integral parts of member 23. Spokes 31 engage the internal surfaces of housing 13 to add reinforcement thereto. In addition, each spoke engages the outer end portions of one of the planar reflective members of the reflector associated with each lamp in the pair in the manner shown. Spokes 31 thus serve to provide support and maintenance of alignment for the planar reflective members 27 and 29 in the positions shown. It is also shown in FIG. 1 that the outermost positions of adjacent members 27 and 29 engage each other to provide still further support and also assure maintenance of the desired alignment with lamps 15.

As an alternative embodiment of the invention, each of the reflectors 26 can further include third and fourth planar reflective members 33 and 35, respectively (only one member 33 is shown in phantom in FIG. 1). Both members are identical and are each located on an interior wall of one of the parts 13' of two-part housing 13 so as to be positioned immediately adjacent the longitudinal sides of each lamp 15. As such, each reflective member is parallel to the longitudinal axis of the respective lamp 15 and is also perpendicular to the adjacent, angled planar reflective members 27 and 29. The described four-sided reflecting arrangement assures that substantially all of the light emitted by each lamp 15 will be directed through the aforedefined peripheral region of housing 13, thus preventing loss thereof through the side portions of the housing. As will be described below, this light is also reflected in a more uniform manner onto a distant subject field than by most known flashlamp units. By way of example, one embodiment of the invention (excluding side reflectors 33, 35) was capable of providing approximately 550 candela-seconds or about 230 zonal lumen-seconds on a central region of a planar rectangular subject field 28 inches high and 38 inches wide located 60 inches from unit 10 during ignition of each lamp therein. Understandably, each lamp was oriented in a horizontal relationship and "aimed" at the center of the subject field during ignition such that its longitudinal axis passed through the center thereof. Also of significance, the intensity values at the outermost regions of the field were no less than about 0.86 of the intensity of the brightest central region. These results indicate a uniformity of intensity heretofore incapable of being provided by earlier flashlamp units and assemblies. For example, typical intensities for outputs provided by the aforementioned "flashbar" units possessed a 0.65 outer-center ratio. It should be added that the total output by unit 10 compared to such earlier units is understandably less; however, such output (e.g. 550 candela-sec.) is considered more than adequate for many of today's newer, high speed films. It must also be added that the aforedescribed outputs are increased substantially by the provision of third and fourth reflectors 33 and 35. By way of example, intensity values of about 750 candela-sec(290 zonal lumen-sec.) on the central region of the defined subject field were possible. In addition, the ratio of intensity from outer regions to center was approximately 0.77.

As mentioned above, unit 10 is adapted for use within an indexing means 37 or similar advancing mechanism associated with a camera 39 (FIG. 4). Means 37 may comprise an integral part of the camera or a separate component adapted for attachment thereto. In either event, this device need only consist of a pair of rotatable engagement members 41 (one shown in phantom in FIG. 3) for engaging opposing sides of housing 13 when unit 10 is located therein (e.g. within a slot 43). In the embodiment of the invention depicted in the drawings, unit 10 includes a pair of rib members 45 located on opposing sides of housing 13 (at central portions thereof). Ribs 45 cooperate with the described members 41 by aligning with slots 47 therein to permit engagement of the ribs and sequential rotation of unit 10. Ribs 41 each move inwardly (direction "b", FIG. 3), effect the described engagement, and thereafter rotate (direction "c") unit 10 the required increment to position a flashlamp 15 at a first, stationary position "P" with respect to indexing means 37 (and therefore camera 39). This position is understood to be the firing position for each lamp 15 within unit 10 and indexing means 37 thus serves to sequentially feed (via rotation) each lamp to this position. The various electrical and mechanical components for providing the necessary engagement and rotation described above are well within the talents of one skilled in the art and further definition is not believed necessary. It is understood, of course, that rotation of unit 10 is accomplished in conjunction with one of the internal components of camera 39 (e.g. film advance mechanism) and that adequate linkage (either electrical or mechanical) must be secured therebetween.

When electrically-activated lamps are used, it is preferred that indexing means 37 include a pair of spaced, fixed contacts 51, 51' located therein and electrically connected to the power source (e.g. piezoelectric element) associated with camera 39. Each contact engages one of the projecting leads (21 or 21') when unit 10 is oriented within the indexing means 37 and the respective lamp from which said leads depend occupies the described firing position "P".

The preferred material for planar reflective members 27, 29, 33 and 35 is aluminized polyvinyl chloride. The preferred material for annular member 23 and spokes 31 is polyvinyl chloride. The materials for flashlamps 15 are well known in the art. It is also possible to utilize an aluminum coating on the interior walls of housing parts 13' to serve as reflective members 33 and 35.

While there have been shown and described what are at present considered the preferred embodiments of the invention, it will be obvious to those skilled in the art that various changes and modifications may be made therein without departing from the scope of the invention as defined by the appended claims. For example, it is readily possible with regard to the invention to mold member 23 as an integral portion of one of the parts 13' of housing 13. Or it is possible to also form member 23 in two sections, each of said parts molded as an integral portion of a respective one of the parts 13'. Other combinations are readily with the scope of the art. It is also possible to provide each of the reflectors with various curvatures, if desired. For example, members 27 and 29 could be formed to approximate a semi-parabolic configuration along the longitudinal dimension thereof. Still further, each of the side reflectors 33 and 35 could possess a curved (e.g. partially circular) interior surface when viewed in cross section.

We claim:

1. In a flashlamp unit including a disk-shaped, light-transmitting housing having a central axis, and a plurality of flashlamps each having a longitudinal axis and arranged within said housing in a radial pattern about said central axis such that said longitudinal axes of said flashlamps pass through said central axis, wherein said flashlamp unit is adapted for cooperating with an indexing means for rotating said housing about said central axis to selectively position each of said flashlamps at a first, stationary location with respect to said indexing means, the improvement comprising:

a plurality of reflectors, each of said reflectors including first and second substantially planar reflective members positioned within said disk-shaped housing adjacent a respective one of said flashlamps and on opposing sides thereof for reflecting a portion of the light emitted from said flashlamp upon ignition thereof through the peripheral region of said light-transmitting housing and for preventing sympathetic ignition between said flashlamp and flashlamps adjacent thereto.

2. The improvement according to claim 1 wherein each of said flashlamps is of the electrically-activated variety and includes a light-transmitting envelope and a pair of conductive leads projecting therefrom, said conductive leads projecting from said housing on opposing sides thereof.

3. The improvement of claim 2 wherein said indexing means includes a pair of fixed contacts located therein and electrically joined to a power source associated with a camera, each of said pairs of conductive leads of said flashlamps being electrically connected to said fixed contacts during said selective positioning of said flashlamps at said first, stationary location.

4. The improvement according to claim 1 wherein each of said planar reflective surfaces is positioned at a predetermined angle with respect to said longitudinal axis of said flashlamp.

5. The improvement according to claim 4 wherein said angle is within the range of from about 25 degrees to about 33 degrees.

6. The improvement according to claim 1 wherein each of said reflectors includes a third, substantially planar reflective member located on a first wall of said disk-shaped housing.

7. The improvement according to claim 6 wherein said third reflective member is located on the interior surface of said first wall, said third reflective member substantially perpendicular to each of said first and second planar reflective members and substantially parallel to said longitudinal axis of said respective flashlamp.

8. The improvement according to claim 6 wherein each of said reflectors includes a fourth, substantially planar reflective member located on a second wall of said disk-shaped housing opposite said first wall, said first, second, third and fourth reflective members directing substantially all of the light emitted by said flashlamp through said peripheral region of said light-transmitting housing.

9. The improvement according to claim 8 wherein said fourth reflective member is located in the interior surface of said first wall, said fourth reflective member substantially perpendicular to each of said first and second planar reflective surfaces and substantially parallel to said longitudinal axis of said respective flashlamp and said third reflective member.

10. The improvement according to claim 1 further including a plurality of spoke members, each of said spoke members located between a respective pair of adjacent flashlamps for engaging one of said first and second planar reflective members of each of said reflectors associated with said pair of adjacent flashlamps to support said planar reflective members and maintain alignment thereof within said housing.

11. The improvement according to claim 1 wherein said first and second planar reflective members of each of said reflectors engages an outer surface of said respective flashlamp in a cooperative manner to support said flashlamp and maintain alignment thereof within said housing.

12. The improvement according to claim 10 wherein each of said spoke members also engages internal surfaces of said light-transmitting housing to add reinforcement thereto.

* * * * *